(12) United States Patent  (10) Patent No.: US 10,112,494 B2
Eisner et al.  (45) Date of Patent: Oct. 30, 2018

(54) EV CONNECTOR HAVING VISUAL INDICATOR

(71) Applicant: Charge-Amps AB, Stockholm (SE)

(72) Inventors: Charlotte Eisner, Stockholm (SE); Fredrik Jonsson, Stockholm (SE)

(73) Assignee: CHARGE-AMPS AB, Stockholm (SE)

( * ) Notice: Subject to any disclaimer, the term of this patent is extended or adjusted under 35 U.S.C. 154(b) by 109 days.

(21) Appl. No.: 15/099,692

(22) Filed: Apr. 15, 2016

(65) Prior Publication Data

US 2017/0297442 A1   Oct. 19, 2017

(51) Int. Cl.
*H02J 7/00* (2006.01)
*B60L 11/18* (2006.01)

(52) U.S. Cl.
CPC ......... *B60L 11/1818* (2013.01); *H02J 7/0045* (2013.01); *H02J 7/0047* (2013.01); *B60L 2230/16* (2013.01)

(58) Field of Classification Search
CPC ...................................................... Y02E 60/12
USPC ........................................................ 320/109
See application file for complete search history.

(56) References Cited

U.S. PATENT DOCUMENTS

| | | | | |
|---|---|---|---|---|
| 5,341,083 A * | 8/1994 | Klontz | ................ | B60L 11/1816 320/109 |
| 6,232,743 B1 * | 5/2001 | Nakanishi | ........... | B60L 11/1803 320/103 |
| 2010/0204865 A1 * | 8/2010 | Nakamura | ................ | B60L 3/00 701/22 |
| 2010/0302781 A1 * | 12/2010 | Markyvech | ........... | B60L 3/0069 362/253 |
| 2013/0271075 A1 * | 10/2013 | Restrepo | ................ | H02J 7/0042 320/109 |
| 2014/0160280 A1 | 6/2014 | Rodriguez et al. | | |
| 2015/0031235 A1 * | 1/2015 | Wiesemann | .......... | B60L 3/0069 439/488 |

FOREIGN PATENT DOCUMENTS

| | | |
|---|---|---|
| DE | 10 2012 021 502 A1 | 5/2014 |
| JP | 2010-182461 A | 8/2010 |
| JP | 2011-146261 * | 7/2011 |
| JP | 2011-146261 A | 7/2011 |
| JP | 2012-244754 A | 12/2012 |
| WO | 2009/035531 A2 | 3/2009 |
| WO | 2015/016946 A1 | 2/2015 |

OTHER PUBLICATIONS

International Search Report for corresponding Patent Application No. PCT/SE2017/050361 dated Jul. 13, 2017.

* cited by examiner

*Primary Examiner* — Yalkew Fantu

(74) *Attorney, Agent, or Firm* — Renner, Otto, Boisselle & Sklar, LLP

(57) ABSTRACT

An electric vehicle, EV, includes a connector configured for charging an electric vehicle, EV, via a EV plug receptacle. The EV connector includes a body having a first plug end configured to be coupled to an EV plug receptacle on an electric vehicle for charging, and a second power cable end configured to be coupled to a power cable. The first end includes a terminal interface having one or more terminal receptacles for receiving one or more terminals positioned within the EV charging receptacle. The first plug end also includes a includes a transparent visual indicator part having one or more light sources.

7 Claims, 1 Drawing Sheet

EV CONNECTOR HAVING VISUAL INDICATOR

TECHNICAL FIELD

The present disclosure relates generally to the field of electric vehicle charging. More specifically, the present disclosure relates to apparatuses for electric vehicle charging and charging.

BACKGROUND

Electric and so-called "hybrid-electric" vehicles store electrical power in an electric power storage, such as a battery. The electric power is used by the vehicle to be converted into useful work, such as by powering electric motors that are connected to the vehicle's wheels. In these hybrid-electric vehicles, a combustion engine, such as a petrol or diesel engine rotates an electric generator that produces electric power, is stored in a battery for powering one or more electric motor(s). The electric power in electric and hybrid-electric vehicles may also be generated using other means such as regenerative braking, which converts the energy dissipated during the braking and slowing down of the vehicle into electric energy for example.

The electric vehicle (EV), which lacks an independently fueled engine, relies on an external power source to provide the energy stored in the battery. The electric vehicle therefore includes a charging plug receptacle that allows a vehicle operator to couple the vehicle to a utility-grid connected electric circuit. Electrical power is transferred from the utility-grid connected electric circuit to the vehicle for charging or charging the batteries. A third type of vehicle, a so-called plug-in hybrid electric ("PHEV") includes an engine for generating power during operation, but also incorporates a charging plug receptacle to allow charging the battery when the vehicle is not in use.

SUMMARY OF THE DISCLOSURE

According to one aspect of the present disclosure, there is provided an EV connector. The EV connector can be configured in such a way as to comply with the SAE J 1772 standard, but is not limited thereto. The EV connector can alternatively without any limitation be adapted to any standard including European and Japanese standards using other voltage levels.

According to one aspect, there is provided an EV connector configured for charging an electric vehicle via an EV plug receptacle. The connector comprises a body having a first plug end configured to be coupled to an EV charging receptacle on an electric vehicle for charging or charging; a second power cable end configured to be coupled to a power cable. The first plug end includes also includes a transparent visual indicator part having one or more visual indicators such as light sources.

According to one embodiment, in addition to the aspect above, the light sources are typically contained under a transparent cover providing weather protection but allowing the light sources to transmit light powerfully enough to a user for easy indication through the cover, also at a distance of a few meters, or even more in a dark environment such as during night.

According to one embodiment, in addition to the aspect above, the visual indicators can further include an opaque, transparent or partially transparent lens or cover over all or each of the visual indicators. The lens or cover can further be tinted a desired color, such as blue, etc. to help further convey the information provided by the visual indicator. The visual indicators include, but are not limited to, a charging indicator, a ready indicator, and a finished indicator. The visual indicator part may also include one or more sound indicators, for instance a fault sound indictor in case no charging can be provided.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the present invention and the advantages thereof, reference is now made to the following description in conjunction with the accompanying figures in which.

Figure 1:
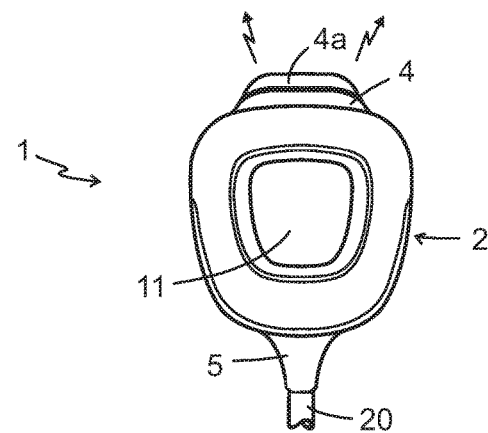
FIG. 1 is a front perspective view of an EV connector in accordance with an embodiment of the present disclosure.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements throughout the several views.

DESCRIPTION OF EMBODIMENTS

The present disclosure is directed to an EV connector. In particular, according to a non-limiting embodiment, the disclosure is directed to an EV connector, that is capable of being permanently coupled to standard EV charging stands, or connectable into standard electric sockets, by means of a plug via an EV control box to receive electric power from a source of electricity such as a power grid. Although the description of embodiments is provided below in conjunction with a particular type of EV connector standard, EV charging stand, EV control box and EV charging plug receptacle, alternate embodiments of the invention may be applicable to other types and configurations of EV connector standards, EV charging stands and EV charging plug receptacles (plug receptacle on the vehicle).

Herein, the term "EV connector" includes also the term "EV plug". The EV connector is configured to receive power from any suitable source of electricity capable of charging and recharging an electric vehicle. Thus, the term "connector" can also sometimes be referred to as a "plug".

The invention may be better understood by reading the following description of non-limiting, exemplary embodiments with reference to the attached drawings, wherein like parts of each of the figures are identified by like reference characters, and which are briefly described as follows.

Now is referred to FIG. 1 illustrating a front perspective view of an EV connector in accordance with an embodiment of the present disclosure The EV connector 1 comprises a body 2 having a hollow housing 2a that can be made of plastic or other non-conductive materials, but can also be made of metal. The EV connector 1 can be embodied according to any EV standard (Electric Vehicle standard) for example Europe, the USA, Asia and may service Type 1 or Type 2 EVs and PHEVs, without any limitation. The body 2 is typically provided to be easy to handle and comfortable for a user a when the fingers of a hand grasp the body 2.

The body 2 has a first plug end 4 configured to be plugged into and coupled to a conventional EV plug receptacle on an electric vehicle for charging and has a second power cable end 5 configured to be, typically permanently, but not limited thereto, coupled to a power cable 20, of which the power cable 20 per se is illustrated partly only in FIG. 1. The first plug end 4 includes a transparent visual indicator part 4a having one or more visual indicators, such as light sources. The visual indicators can be considered to be part of the visual indicator part or contained therein. Therefore, they are not explicitly shown. The terminal interface can be provided as a so-called "type-2" interface, complying with standard IEC 62196, but is by no means limited to this.

Figure 2:
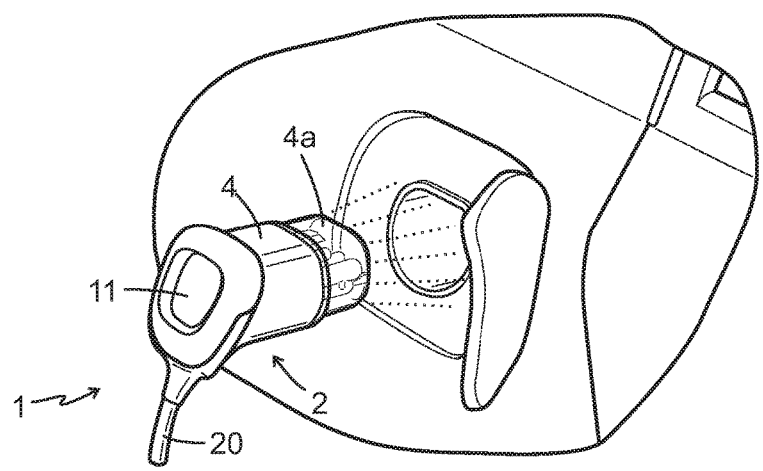
FIG. 2 is a side perspective view of the EV connector of FIG. 1 just before being inserted into, or removed from, an EV charging plug receptacle of a vehicle.

Now is referred also to FIG. 2, which is a side perspective view of the EV connector of FIG. 1 just before being inserted into, or removed from, an EV charging plug receptacle of a vehicle The EV connector 1 typically also includes a terminal interface having one or more terminal receptacles (see FIG. 2) suitable for receiving one or more terminals positioned within the EV charging receptacle of the electric vehicle. The visual indicator part 4a is typically adapted to indicate the status of the power source, vehicle charge state, fault conditions, etc. and in particular to via the visual indicator 4a visually indicate if the EV connector 1 is available for charging by indicating with light, for instance fixed white light as flashlight. This helps a user in a dark environment to handle the EV connector 1 in a convenient way for instance to make sure that the power grid is supplying power.

Alternatively, if the EV connector 1 is engaged into the vehicle and already charging, the visual indicator part 4a indicates this in another way for instance circling blue light. This helps a user navigating and operating the EV connector 1 in the dark. Of course, also other colors or signaling intervals may be used alternatively without departing from the invention, for instance another color such as green, yellow or rapid flashing blue light when charging is completed.

The light sources of the visual indicator part 4a may be one or more, say 4, and embodied as light-emitting diodes. The light sources are typically contained under a transparent cover providing weather protection but allowing the light sources to transmit light powerfully enough to a user for easy indication through the cover, also at a distance of a few meters, or even more in a dark environment such as during night.

The visual indicators of the visual indicator part 4a can further include an opaque, transparent or partially transparent lens or cover over all or each of the visual indicators. The lens or cover can further be tinted a desired color, such as blue, etc. to help further convey the information provided by the visual indicator. The visual indicators include, but are not limited to, a charging indicator, a ready indicator, and a finished indicator. The visual indicator part 4a may also include one or more sound indicators (not shown), for instance a fault sound indictor in case no charging can be provided.

In this and other exemplary embodiments, a controller, typically provided inside the body 2, may prevent electricity from flowing through the EV connector 1 and EV receptacle and into the electric vehicle until a secure latching between the EV connector and the EV plug receptacle of the electric vehicle is determined or sensed. This is not illustrated in more detail, since it is well-known technology for the skilled person.

The display 11 can also be configured to via itself or via an external device such as a smart phone communication with the display, provide a charging current selector. As an example, if the power source is supplying 100-240 V, as an example it is possible to set the charging current selector to charge with 6, 10 or 16 ampere. As an example, at places where the electric installation is old or weak, it is possible to charge with 6 ampere. The display may also be configured to via itself or via an external device, provide a user's power consumption, cost of power purchased etc.

Figure 3:
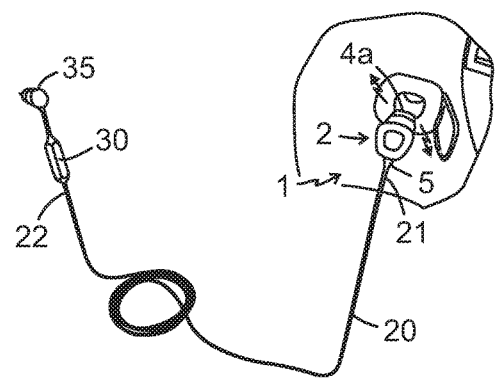
FIG. 3 is a schematic overall-view of the EV connector of FIG. 1 coupled to a power cable, and an EV control box and provided for charging an electric vehicle.

Now is referred to FIG. 3, which is a schematic overall-view of the EV connector 1 of FIG. 1 coupled to a power cable 20, and via an EV control box 30 coupled to a so-called Schuko-plug is provided for charging an electric vehicle from a conventional power source (not shown) such as a power grid.

The exemplary EV connector 1 also includes a display 11, which can be provided on an exterior part of the body 2 typically facing a user. As examples, but not limited thereto, the display 11 is typically embodied as a touch sensitive display 11. The display 11 may alternatively include or can be communicating with an external (external to the display) touch sensor or include control means (not shown in this view) configured to control the EV connector 1, for instance via a smart-phone on site, or via a cellular network from a remote location. The display 11 can also comprise: a power indicator, configured to present charging power or the like; a charging current indicator, configured to present charging current, for instance 6, 10 or 16 ampere; user verification configured to verify a user allowed to use the EV connector, such as a user verification based on a user specific code such as verifying a PIN-code; heat sensor(s) and indicators configured to present warning for over-heating or the like; latching control configured to latch or unlatch the EV connector 1 to or from the vehicle; and wireless communication means configured to communicate with an external device such as a smart-phone configured to provide one or more of the features provided by the display, for instance by means of suitable soft-ware down-loaded such an application program executed by a processor of the external device.

In certain exemplary embodiments, the latching controller, when manipulated, typically by a user such as a vehicle driver, sweeping the touch sensors actuates an electro-mechanical latch. This is disclosed in the co-pending US patent application of the same applicant. The latching control may in alternative embodiments be provided in different various modifications. This is a great advantage to users who find it difficult to engage the EV connector 1 before charging the electric vehicle or disengage the EV connector from the vehicle after having charged the electric vehicle.

This is a great advantage compared to prior art all-mechanical latching members, which may often be troublesome to manipulate for many users.

Electric power is provided by a power source which may include any suitable type of AC and/or DC power source. The electric power flows from the power source to electric components in an EV charger, via an electrical cable to the EV connector and to the vehicle. The EV charger comprises electrical components for receiving electric power from a power source, such as an electric grid through a standard wall mounted electrical receptacle, and providing that electric power to an electric vehicle, through the EV connector 1.

Now is referred to FIG. 3.

FIG. 3 illustrates an EV connector 1 coupled to a power cable 20 comprising a first end 21 and a second distal end 22, the first end 21 of the power cable 20 coupled to the EV connector 1 according to another embodiment of the present disclosure, the second distal end 22 coupled to a power source 30, herein a slim EV charger 30 mounted on the power cable 20 and configured for receiving power from a power grid according to certain exemplary embodiments. In certain exemplary embodiments, the EV connector 1 is directly coupled to the EV charger, wherein the power cable 20 electrically and mechanically couples the EV charger 30 to the EV connector 1. Alternatively, other devices and systems for connecting one device to another can be used. The EV charger 30 may include components such as: circuit boards, transformers, modules, lights, displays, charging circuits and/or any other components to implement an electric vehicle supply circuit such as a circuit for charging an electric vehicle with the EV connector 1. The electric components within the EV charger 30 can also include, but are not limited to, a ground fault circuit interrupter sensor, and a current sensor. All components may be reordered and/or rearranged in any suitable manner, for instance partly inside the body 2 of the EV connector 1. The EV charger 30 provides electricity to an electric vehicle through an electric power cable and an EV connector 1 that plugs into a corresponding charging receptacle on the electric vehicle.

In addition or alternatively, the EV connector 1 may also include circuit boards, transformers, modules, lights, displays, charging circuits and/or any other components to implement an electric vehicle supply circuit such as a circuit for charging or recharging an electric vehicle with the EV connector 1. For example, one embodiment may include circuitry to implement an AC Level 1 charging device that operates from 120 VAC power and includes one or more indicator lights on the EV charger 30 to indicate the status of the power source, vehicle charge state, fault conditions, etc. As another example, a different embodiment of the EV charger 30 may include circuitry to implement an AC Level 2 charging device that operates from a dedicated source of 240 VAC power and includes an alphanumeric display with keypad and/or network capabilities (not shown). As a further example, in another embodiment the EV charger 30 may include a charging circuit with an AC/DC converter to implement a DC charging device.

The exemplary EV charger 30 houses electrical components for receiving electrical power from a power source such as an electrical grid through a standard wall mounted electrical receptacle and providing that electrical power to an electric vehicle, through the EV connector 1.

The EV charger 30 may also include one or more visual indicators. The visual indicators can be lights. For example, the visual indicators can include light emitting diodes or other light sources. The EV charger 30 may be the applicant's sold under the trade mark Halo Wallbox™.

Typically, the charging indicator provides a visual indication that the EV connector 1 is connected to the EV charging receptacle of the vehicle and is currently charging the batteries of the electric vehicle. Typically, the ready indicator provides a visual indication that the EV connector 1 is receiving electrical power and is ready to be coupled to the EV charging receptacle to provide electric power to the batteries of the electric vehicle. Typically, the finished indicator provides a visual indication that the charging sequence has been completed.

Typically, the electric vehicle charger stand includes a housing or stand that is mounted to the ground or some other surface. The EV charger is typically hard-wired to an electrical grid, or detachably connected via a plug 35, for instance a Schuko-plug to a socket, to receive power from a source of electricity (not shown).

Although each embodiment has been described in detail, it is to be construed that any features and modifications that are applicable to one embodiment are also applicable to the other embodiments. Although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

The invention claimed is:

1. An electric vehicle connector configured for charging an electric vehicle via an electric vehicle plug receptacle, said electric vehicle connector comprising:
   a body having
   a first plug end configured to be coupled to the electric vehicle plug receptacle on the electric vehicle for charging; and
   a second power cable end configured to be coupled to a power cable,
   wherein the first end includes a terminal interface having one or more terminal receptacles for receiving one or more terminals positioned within the electric vehicle charging receptacle,
   wherein the first plug end also includes a transparent visual indicator part having one or more light sources, and
   wherein the transparent visual indication part encircles the one or more terminal receptacles to allow for viewing of the one or more light sources regardless of position of a viewer relative to the transparent visual indicator part.

2. The electric vehicle connector of claim 1, wherein the light sources of the visual indicator part are light-emitting diodes.

3. The electric vehicle connector of claim 1, wherein the light sources are typically contained under a transparent cover.

4. The electric vehicle connector of claim 3, wherein the visual indicators include an opaque, transparent or partially transparent lens or cover over all or each of the visual indicators.

5. The electric vehicle connector of claim 4, wherein the lens or cover is tinted.

6. The electric vehicle connector of claim 1, configured to indicate one or more of: a status of a power source coupled to the second power cable end, a vehicle charge state of the electric vehicle coupled to the first plug end, or fault conditions.

7. The electric vehicle connector of claim 1, wherein the one or more light sources are configured to provide fixed white light for use as a flashlight in dark environments.

* * * * *